(12) United States Patent
Flood, Jr. et al.

(10) Patent No.: US 7,484,617 B1
(45) Date of Patent: Feb. 3, 2009

(54) SEALING SYSTEM FOR CONVEYING BELT

(75) Inventors: Bob Flood, Jr., Marquette, MI (US); Jeremy Nylund, Marquette, MI (US)

(73) Assignee: Argonics, Inc., Marquette, MI (US)

( * ) Notice: Subject to any disclaimer, the term of this patent is extended or adjusted under 35 U.S.C. 154(b) by 0 days.

(21) Appl. No.: 11/998,741

(22) Filed: Nov. 30, 2007

(51) Int. Cl.
*B65G 21/20* (2006.01)

(52) U.S. Cl. .................................. 198/836.1; 198/836.3

(58) Field of Classification Search ............... 198/836.1, 198/836.3
See application file for complete search history.

(56) References Cited

U.S. PATENT DOCUMENTS

| | | |
|---|---|---|
| 2,584,288 A | 2/1952 | Przybylski |
| 2,593,610 A | 4/1952 | Roberts |
| 2,665,795 A | 1/1954 | Holwick |
| 2,883,035 A | 4/1959 | Erisman |
| 2,988,202 A | 6/1961 | Pampel et al. |
| 3,024,893 A | 3/1962 | Lambert |
| 3,253,305 A | 5/1966 | Granath |
| 3,399,466 A | 9/1968 | Hartley |
| 3,499,523 A | 3/1970 | Clegg |
| 3,707,222 A | 12/1972 | Hartley |
| 4,204,595 A | 5/1980 | Marrs |
| 4,231,471 A | 11/1980 | Gordon |
| 4,236,628 A | 12/1980 | Stahura |
| 4,641,745 A | 2/1987 | Skates |
| 4,667,810 A | 5/1987 | Cowpertwait et al. |
| 5,016,747 A | 5/1991 | Veenhof |
| 5,129,508 A * | 7/1992 | Shelstad .................. 198/860.3 |
| 5,513,743 A * | 5/1996 | Brink ....................... 198/836.1 |
| 5,774,951 A * | 7/1998 | Close et al. .............. 198/836.1 |
| 6,318,545 B1 | 11/2001 | Ross, II |
| 6,547,062 B2 | 4/2003 | Wiggins |
| 6,763,935 B2 * | 7/2004 | Ostman .................... 198/836.1 |

* cited by examiner

*Primary Examiner*—James R Bidwell
(74) *Attorney, Agent, or Firm*—Wood, Phillips, Katz, Clark & Mortimer (57) ABSTRACT

A sealing assembly for a conveying system between a conveying belt and a containment wall. The sealing assembly has a primary sealing subassembly, and a secondary sealing subassembly joined by a connecting assembly. The connecting assembly defines a locally flexible region whereat the sealing assembly can be reconfigured to allow selective movement of the primary and secondary sealing subassemblies, each relative to the other. The sealing assembly is configured so that with the sealing assembly in an operative position on a conveying system: a) the primary sealing subassembly is situated to block passage of material from a conveying portion of a conveying belt laterally beyond a containment wall; and b) the secondary sealing subassembly is situated to laterally confine material that has moved laterally beyond the containment wall from the conveying portion of the conveying belt, along a length of the conveying system.

20 Claims, 6 Drawing Sheets

SEALING SYSTEM FOR CONVEYING BELT

BACKGROUND OF THE INVENTION

1. Field of the Invention

This invention relates to conveying systems with movable conveying belts for transporting discrete objects and material and, more particularly, to a sealing system for controlling migration of objects/materials off of the conveying belt transversely to a conveying direction.

2. Background Art

Conveying belts are used in a wide range of environments to transport materials, that are typically in a flowable form, and objects between spaced locations. A typical conveying section will have spaced rollers around which a conveying belt is trained so that an upwardly facing belt surface is situated to receive and move materials and objects as the belt is advanced. Virtually any type of object or material that can be supported by the upwardly facing surface on the conveying belt can be transported with such a system.

As one example, it is known to transport particulate material using such systems. Typically, the belt will be supported in a trough-shaped configuration for this purpose, as shown in exemplary U.S. Pat. No. 6,547,062. The angled, lateral edges of the belt function to funnel materials towards the center of the belt, whereas said material might otherwise tend to migrate laterally off of the belt.

To further confine lateral movement of the conveying materials, it is common to incorporate containment walls at the lateral sides of the belt. Commonly, a vertical gap will be maintained between these walls and the upwardly facing horizontal or angled belt surface regions to avoid binding therebetween during operation. To confine migration of material through this vertical gap and laterally off of the belt to the adjacent environment, it is known to use sealing assemblies with edges, made from a resilient material, that will engage, and conform to accommodate dimensional and configurational variations in, belt surfaces during operation of the belt.

An exemplary sealing assembly is shown in U.S. Pat. No. 5,016,747. The sealing assembly shown in this patent consists of a primary sealing subassembly and a secondary sealing subassembly. The primary sealing subassembly is responsible for substantially blocking the vertical gap between the containment wall and the belt. The secondary sealing subassembly is arranged laterally outside the containment wall and confines any material that finds its way laterally outwardly through the gap between the primary sealing subassembly, and belt. This condition is likely to occur since it is specifically taught in this patent that a gap be maintained between the primary sealing subassembly and the conveying belt.

Each time the sealing assembly, or any portion thereof, must be repaired or replaced, an entire line may have to be shut down, even though the affected region constitutes only a small portion of the overall system. This may have a significant economic impact in terms of the operational interruption as well as its necessitating having on hand available parts and competent labor to effect repairs. Thus, designers of these sealing assemblies strive towards a design that will have an extended life. This objective generally leads designers to engineer sealing assemblies with relatively thick components.

With the sealing assembly made from resilient materials, at a certain thickness, it is difficult to shape and install the sealing assembly on site. With such designs, the primary sealing subassembly and secondary sealing subassembly may remain at all times generally at a fixed angle with respect to each other. The separate lengths of the sealing assembly may thus have a substantial effective volume as a result of which they take up valuable space in facilities and may account for high shipping costs. This configuration may also make handling difficult, as during transportation, installation, and maintenance thereof. Still further, since the sealing components are relatively rigid by reason of their thickness, a gap may have to be maintained between the primary sealing subassembly and belt to avoid binding during operation. This gap affords an egress for particularly small particles.

Alternatively, the primary and secondary sealing subassembly may be joined in a manner that they are collapsible towards each other for storage and handling and repositionable angularly relative to each other during assembly. A single molded piece may have to be made thin enough to hinge and thereby make this relative movement possible. This may create a weakening, as result of which the sealing assembly is prone to failure. Alternatively, a thicker hinge region may inhibit relative movement of the sections, whereupon there is a significant amount of distortion that is caused during system setup. This may compromise the integrity of the seal afforded by the primary and/or secondary sealing subassemblies.

To address the above-described handling and storage problems, it is known to make the sealing assemblies so that at least a part of the secondary sealing subassembly is separable from the primary sealing subassembly. This allows compaction of the sealing assemblies for storage and transportation and also gives more flexibility as to designs that might otherwise be dimensionally cumbersome. However, this type of system necessitates potentially time consuming assembly steps and may require a relatively high level of skill to accomplish this, and subsequent repairs, at the installation site.

With all of the above designs, improper installations may lead to loss of materials from the conveying system to the outside environment and potentially premature failure of a part or all of a sealing assembly. In a worse case, the improper installation may interfere with the basic conveying system function.

The industry continues to seek out sealing assembly designs that are capable of being consistently installed and maintained in a relatively economical manner, that will have a long life, that will effectively perform a sealing function, and that are configured for convenient handling, storage, and transportation.

SUMMARY OF THE INVENTION

In one form, the invention consists of a sealing assembly for a conveying system between a conveying belt and a containment wall situated laterally relative to a conveying portion of the conveying belt. The sealing assembly is made up of a primary sealing subassembly, a secondary sealing subassembly and a connecting assembly that joins and maintains the primary sealing subassembly and secondary sealing subassembly together. The connecting assembly defines a locally flexible region whereat the sealing assembly can be reconfigured to allow selective movement of the primary and secondary sealing subassemblies, each relative to the other. The sealing assembly is configured so that with the sealing assembly in an operative position on a conveying system: a) the primary sealing subassembly is situated to block passage of material from a conveying portion of a conveying belt laterally beyond a containment wall; and b) the secondary sealing subassembly is situated to laterally confine material that has moved laterally beyond a containment wall from a conveying portion of a conveying belt, along a length of the conveying system.

In one form, the connecting assembly is constructed to allow the primary and secondary sealing subassemblies to be placed and maintained in a plurality of different relative positions without the application of any external forces upon the sealing assembly.

In one form, the connecting assembly is in the form of a fabric material.

In one form, the connecting assembly consists of a layer made from woven fibers.

In one form, the connecting assembly consists of a layer with a mesh construction.

In one form, the connecting assembly is in the form of a flexible layer that is embedded in at least one of the primary and secondary sealing subassemblies.

The flexible layer may be embedded in each of the primary and secondary sealing subassemblies.

In one form, the primary and secondary sealing subassemblies and connecting assembly each has a thickness. The connecting assembly is joined to the primary sealing subassembly at an end of the primary sealing subassembly and to the secondary sealing subassembly at an end of the secondary sealing assembly. The thickness of the connecting assembly is substantially less than the thickness of at least one of the ends of the primary and secondary sealing subassemblies.

In one form, the thickness of the connecting assembly is substantially less than the thickness of each of the ends of the primary and secondary sealing subassemblies.

In one form, the sealing assembly is provided in combination with a conveying system on which the sealing assembly is placed in an operative position. The conveying system includes a conveying belt with an upwardly facing surface having a conveying portion and a containment wall situated laterally relative to the conveying portion of the conveying belt so that a gap is defined between a bottom edge of the containment wall and the upwardly facing conveying belt surface. The combination further includes a mounting assembly through which the sealing assembly is maintained in the operative position.

In one form, the primary sealing subassembly has a first wall that is attached to the containment wall and at least partially blocks the gap between the bottom edge of the containment wall and the upwardly facing conveying belt surface to thereby block passage of material through the gap to laterally outside of the containment wall.

In one form, the upwardly facing conveying belt surface has a generally horizontally oriented surface region defining at least part of the conveying portion and an angled surface region that projects upwardly laterally away from the horizontally oriented surface region. The secondary sealing subassembly has a second wall that bears against the angled surface region to confine material that has passed through the gap to laterally outside of the containment wall.

In one form, the mounting assembly has a repositionable holding wall and the first and second walls are maintained against each other and captively between the holding wall and the containment wall.

In one form, the first wall has first and second oppositely facing generally flat surfaces and the second wall has third and fourth oppositely facing generally flat surfaces. With the sealing assembly in the operative position, a portion of the fourth wall facially abuts to the containment wall and portions of the first and third walls are facially engaged, each with the other.

In one form, the sealing assembly has a length and the second wall has at least a first rib extending lengthwise of the sealing assembly and having a rounded surface portion that engages the angled surface region along a length of the sealing assembly.

In one form, the second wall has a locally reduced thickness defining a hinge region extending along the length of the sealing assembly.

In one form, the second wall has a second rib extending generally parallel to the first rib with a rounded surface portion that engages the angled surface region along the length of the sealing assembly.

In one form, the connecting assembly has a different composition than a composition of each of the primary and secondary sealing subassemblies.

In one form, the flexible layer has a length between the primary and secondary sealing subassemblies of at least 0.5 inches.

In one form, the primary and secondary sealing subassemblies each is made from a molded polyurethane material.

DETAILED DESCRIPTION OF THE DRAWINGS

Figure 1:
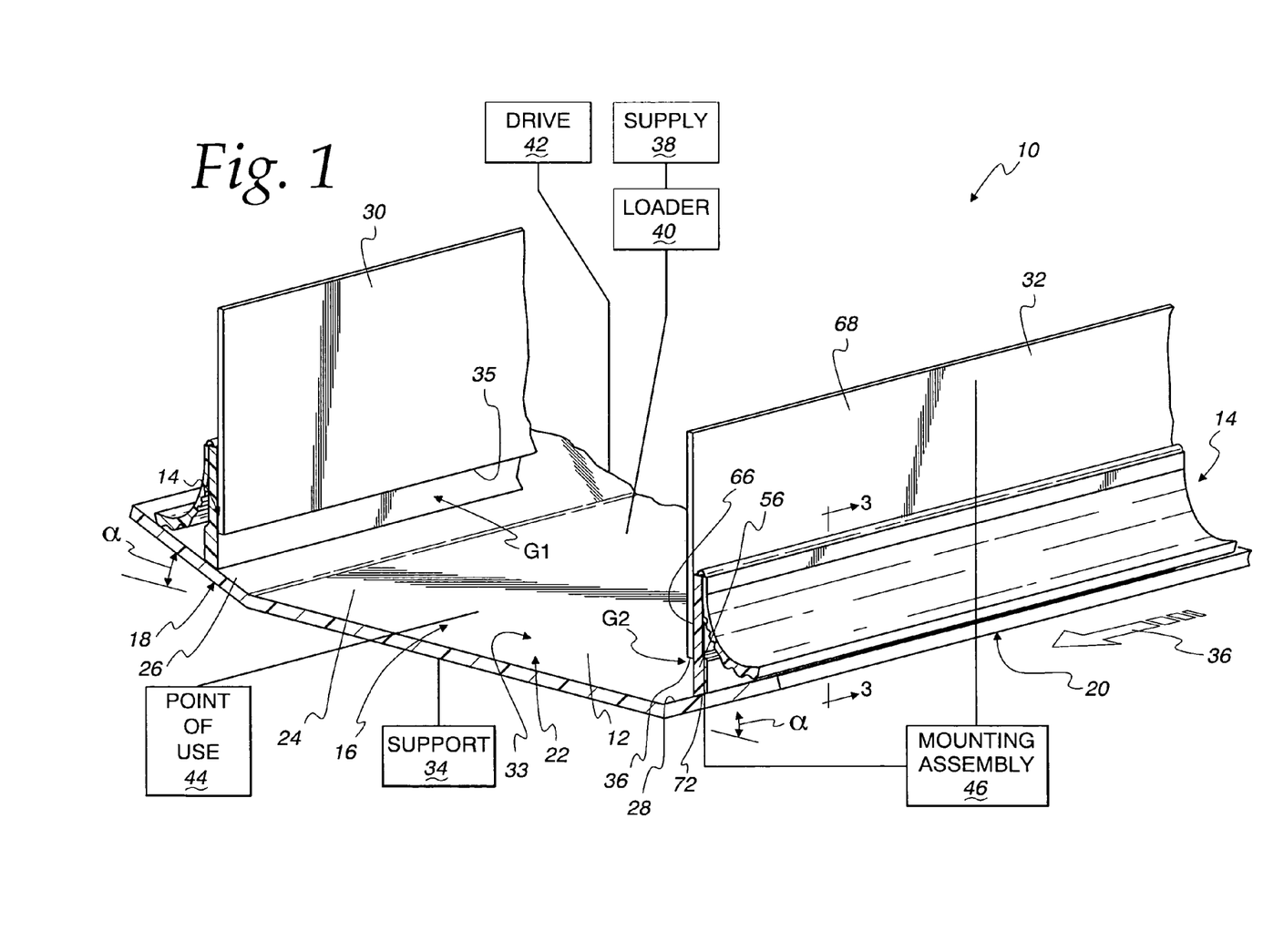
FIG. 1 is a partially schematic, fragmentary, perspective view of a conveying system including a conveying belt with a sealing assembly, according to the present invention, maintained in an operative state thereon by a mounting assembly.

In FIG. 1, an exemplary conveying system is shown at 10 incorporating a conveying belt 12 into which a sealing assembly at 14, according to the present invention, is incorporated. The conveying system 10 is designed for individual objects or materials such as bulk aggregate. The materials conveyed might be in particulate form, or may be a composite material, such as gravel, coal, or the like. The nature of the material being conveyed is not critical to the present invention, as virtually any type of discrete object or material, that can be conveyed between any two spaced locations through a supporting surface, is contemplated by the invention.

The conveying belt 12 has a horizontal section 16 and spaced side portions 18, 20 extending angularly away from the horizontal section 16 at the sides thereof. The horizontal section 16 and side portions 18, 20 cooperatively produce an upwardly facing, trough-shaped, conveying surface 22 with a generally horizontally oriented surface region 24 and angled surface regions 26, 28 that project upwardly laterally away from the horizontally oriented surface region 24 at the side portions 18, 20, respectively, each at an angle $\alpha$.

Vertically extending containment walls 30, 32 project upwardly from the conveying surface 22 to laterally confine material to the horizontally oriented surface region 24 and portions of the surface regions 26, 28 between the containment walls 30, 32 that together define the primary conveying portion 33 of the conveying belt 12. The sealing assembly 14 could be used alternatively in association with containment walls associated with a flat belt or with the containment walls 30, 32 overlying the horizontally oriented surface region 24 or the juncture between the horizontally oriented surface region 24 and angled surface regions 26, 28.

The conveying belt 12 is mounted on a support 34 for movement in a predetermined, lengthwise conveying path, as indicated by the directional arrow 36. The material to be conveyed is deposited on the conveying surface 22 by any suitable means. The material may be manually introduced by hand or funneled from a bulk supply 38, as through an appropriate loader 40. Material deposited on the conveying surface 22 is advanced by movement of the conveying belt 12, which is effected through any appropriate drive 42. The conveyed material upon the conveying surface 22 may be advanced between any two spaced locations and delivered to any appropriate point of use, indicated schematically at 44.

At the time of loading, and during operation, the containment walls 30, 32 project vertically upwardly from the spaced locations depicted, thereby to block migration of material from the primary conveying portion 33 of the conveying belt 12 laterally through gaps G1, G2, respectively between the bottom edges 35, 36 of the containment walls 30, 32, and the upwardly facing conveying surface 32.

The sealing assemblies 14 are connected, one each, to the containment walls 30, 32 and are maintained in an operative position thereon, each by a mounting assembly 46, shown in FIG. 1 for the representative sealing assembly 14 at the containment wall 32. The manner of attaching the sealing assembly 14 to each of the containment walls 30, 32 is not critical to the present invention and can be done in virtually a limitless number of different ways. Thus, the showing of the mounting assembly 46 is schematic in FIG. 1 to encompass the specific form shown herein and other different structures consistent with the teachings herein.

The sealing assemblies 14 could also be mounted in operative positions independently of the containment walls 30, 32, though this is not a preferred manner of attachment.

The details of the sealing assembly 14, and its interaction with the conveying system 10, will now be described with reference to FIGS. 2-11, in conjunction with FIG. 1. Each sealing assembly 14 has a length in the direction of the double-headed arrow L in FIG. 10. Each sealing assembly 14 may be made to extend the full length of the conveying system 10. More preferably, a plurality of discrete lengths of the sealing assembly 14 are provided and placed end-to-end to produce the desired combined length. Regardless of the particular structure, it is preferred that the sealing assemblies 14 substantially fully block the gaps G1, G2, respectively beneath the containment walls 30, 32.

The sealing assembly 14 consists of a primary sealing subassembly 48, a secondary sealing subassembly 50 and a connecting assembly 52 that joins and maintains the primary and secondary sealing subassemblies 48, 50 together. The connecting assembly 52 defines a locally flexible region whereat the sealing assembly 14 can be reconfigured to allow selective relative movement of the primary and secondary sealing subassemblies 48, 50. The connecting assembly 52 is constructed to allow the primary and secondary sealing assemblies 48, 50 to be placed and maintained in a plurality of different relative positions without the application of any external forces thereto.

Figures 2, 3:
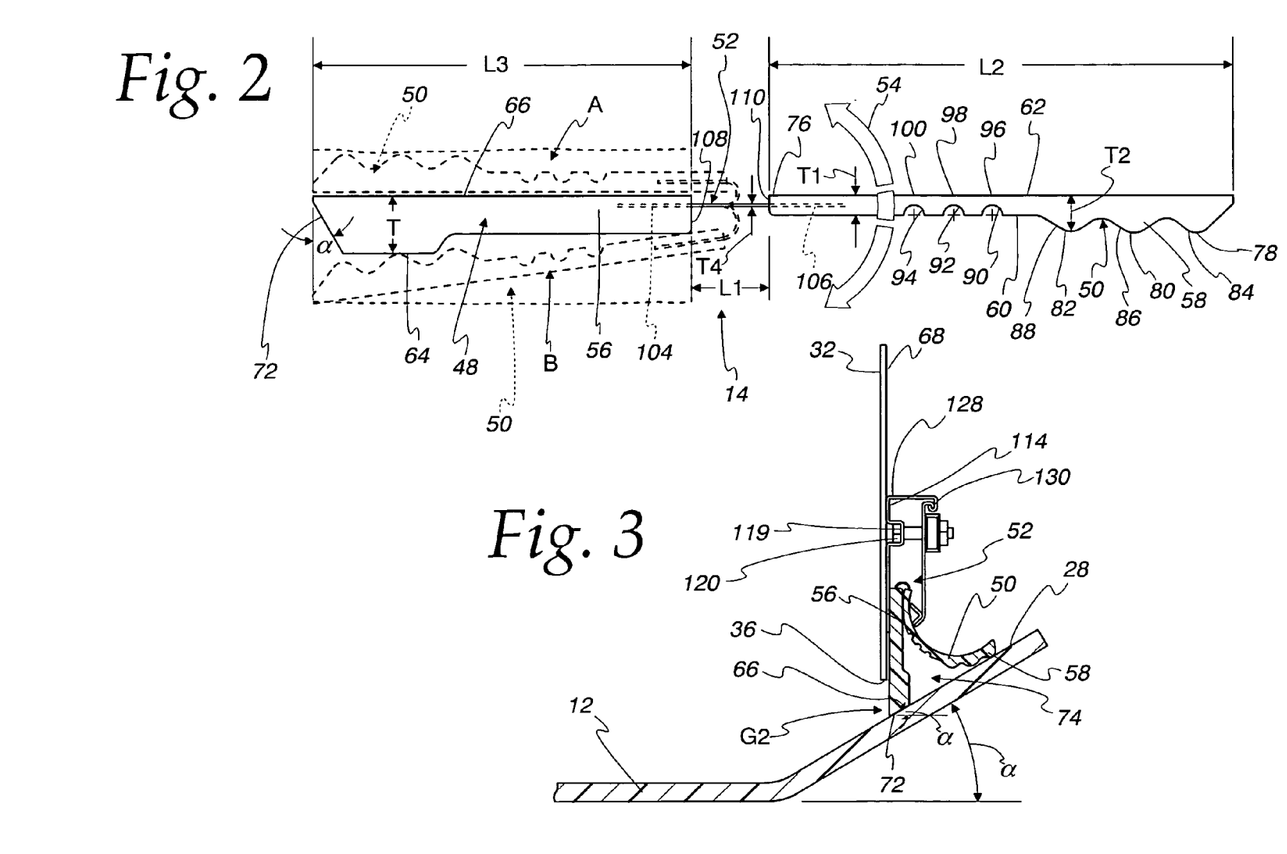
FIG. 2 is an end elevation view of the sealing assembly that is made up of primary and secondary sealing subassemblies joined by a connecting assembly and with the sealing assembly in a flattened state.
FIG. 3 is a cross-sectional view of the conveying system and sealing assembly taken along line 3-3 of FIG. 1.
Figure 4:
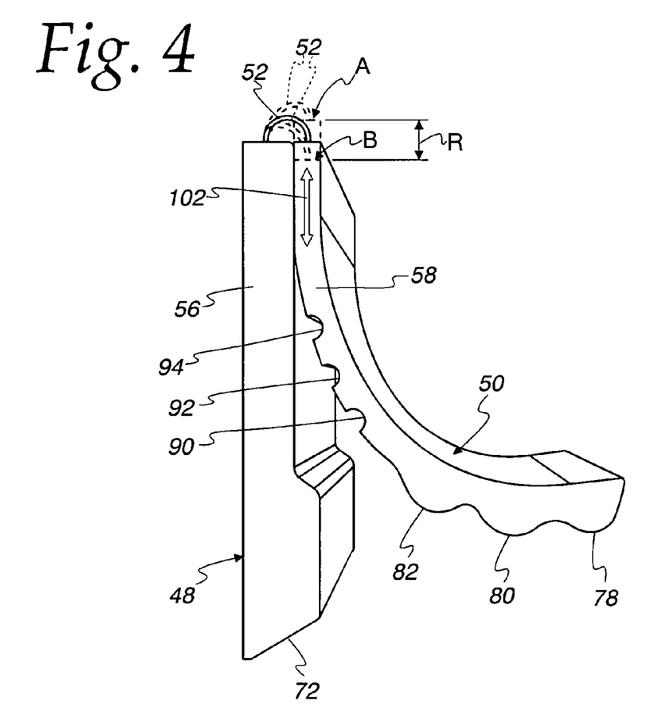
FIG. 4 is an enlarged, fragmentary, perspective view of the sealing assembly, configured in the operative state of FIGS. 1 and 3, and shown apart from the conveying system and mounting assembly.
Figure 5:
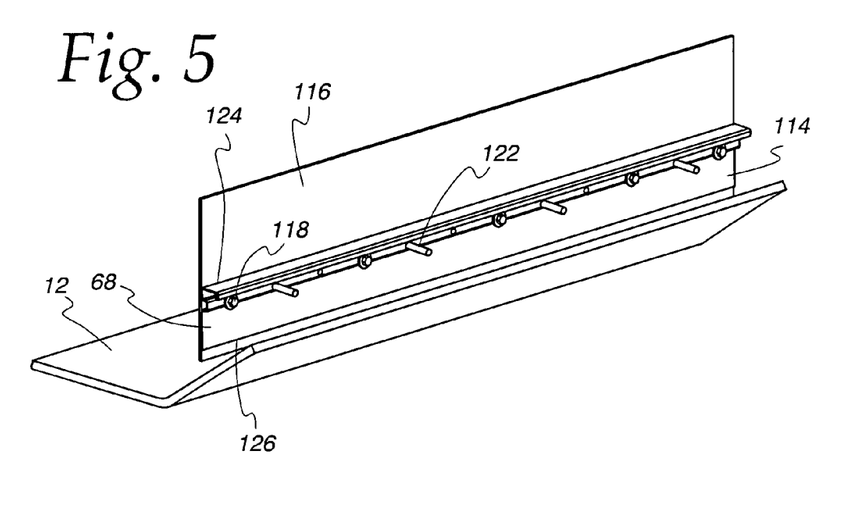
FIG. 5 is a fragmentary, perspective view of a portion of the conveying system including a containment wall with a holding wall on the mounting assembly on the sealing assembly separated therefrom.
Figure 6:
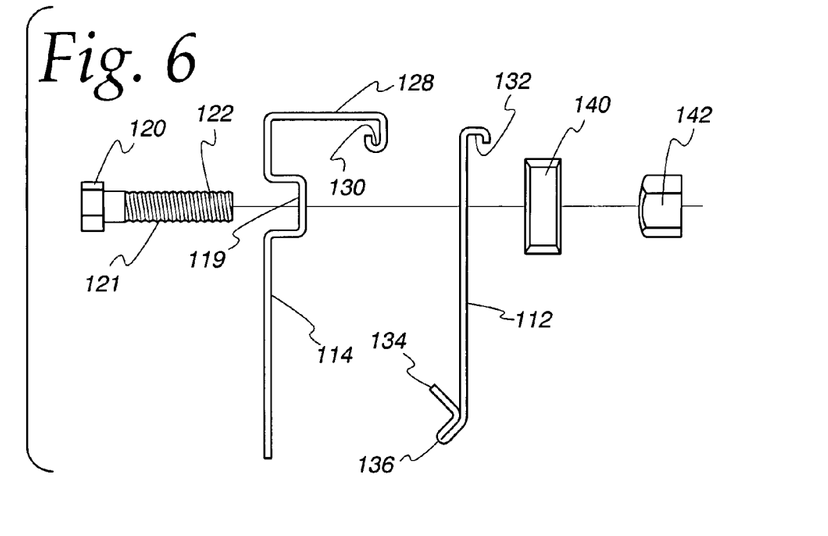
FIG. 6 is an exploded, end, elevation view of the mounting assembly in relationship to a base plate that is part of the containment wall.

For example, the sealing assembly can be laid upon a flat surface in the configuration shown in FIG. 2, upon which it will maintain that particular shape. The connecting assembly 52 acts as a hinge whereby the secondary sealing subassembly 50 may be pivoted in the direction of the arrow 54 from the solid line position into the dotted line position at A in that same Figure. Without the application of any force, this folded relationship of the primary and secondary sealing subassemblies 48, 50 can likewise be maintained without the application of any force. The secondary sealing assembly 50 might alternatively be pivoted from the solid line position of FIG. 2 oppositely to the direction of the arrow 54 to a third relative position, likewise against the secondary sealing assembly 50, as shown in dotted lines at B. Between the extreme A and B positions, there is preferably no significant elastic memory in the connecting assembly 52 that causes the sealing assembly 14 to spring back to any "set" shape to establish any specific predetermined relationship between the primary and secondary sealing subassemblies 48, 50. The significance of this construction will be apparent from the description hereinbelow relating to the mounting of the sealing assembly 14 in the operative position upon the conveying system 10.

The primary sealing subassembly 48 is defined by a substantially flat first wall 56. The secondary sealing subassembly 50 is likewise in the form of a second flat wall 58. The second wall 58 has oppositely facing first and second surfaces 60, 62, with the first wall 56 having corresponding, oppositely facing third and fourth surfaces 64, 66.

Figure 10:
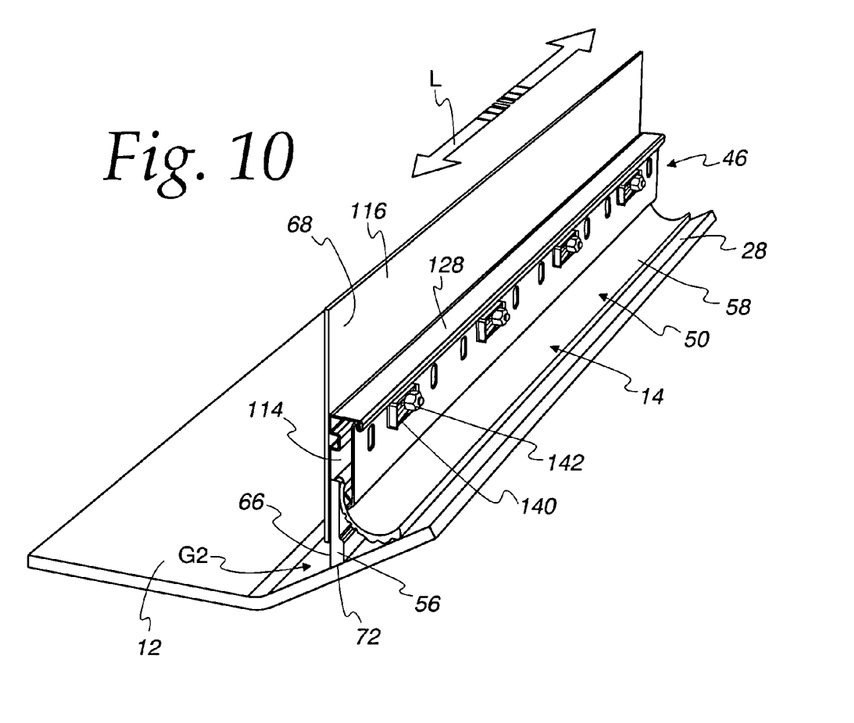
FIG. 10 is a view as in FIG. 9 wherein cam plates are repositioned to secure the holding wall in its holding position.
Figure 11:
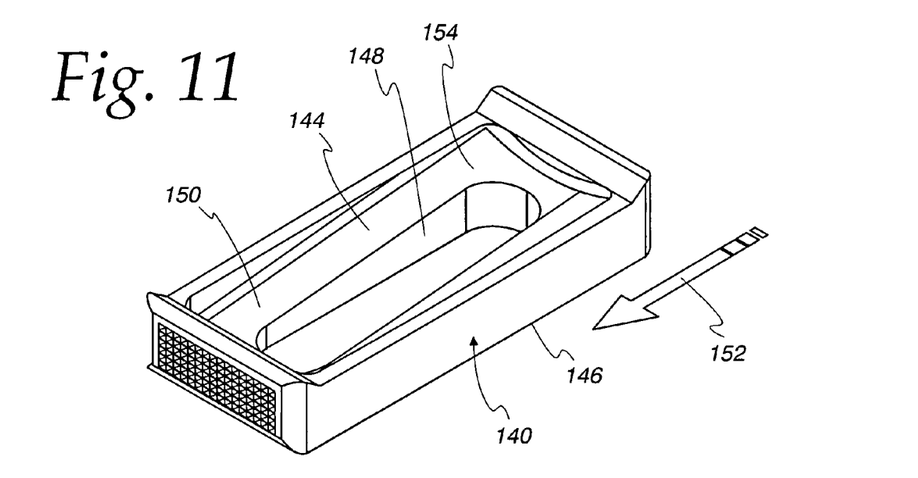
FIG. 11 is an enlarged perspective view of one of the cam plates shown in FIGS. 8-10.

With the sealing assembly 14 in the operative position on the exemplary containment wall 32, shown in FIGS. 1, 3 and 10, the fourth surface 66 facially abuts to the laterally outwardly facing surface 68 of the containment wall 32. The wall 56 extends to below the bottom edge 36 of the containment wall 68 to block the gap G2. The bottom edge 72 of the wall 56 is inclined at substantially the same angle $\alpha$ as is the angled surface region 28, whereby the bottom edge 72 contacts the angled surface region 28 over its full extent and over a lateral dimension that is slightly greater than the thickness T of the wall 56 adjacent to the bottom edge 72. The wall 56 is primarily responsible for blocking passage of material from the conveying portion 33 of the conveying belt 12 laterally through the gap G2. Any material that does find its way laterally past the wall 56 is ideally captively confined in a region at 74 by the secondary sealing subassembly 50.

The wall 58 making up the secondary sealing subassembly 50 has one end 76 that is fixed in place against the wall 56, as hereinafter described, with the sealing assembly 14 in the operative position of FIGS. 1, 3 and 10. With the end 76 held in place, the wall 58 is flexed to the curved shape in FIGS. 1, 3, 4 and 10. In this curved shape, there are residual forces in the wall 58 that tend to cause the wall 58 to assume its straight, undeformed state. These residual forces bear the wall 58 downwardly and sealingly against the angled surface region 28.

To effect sealing, the wall 58 has a number of ribs 78, 80, 82 which extend lengthwise of the sealing assembly 14 and in spaced relationship. The ribs 78, 80, 82 have rounded surface portions 84, 86, 88, consecutively, which are designed to engage the lateral extent of the angled surface region 28. Depending upon the precise shape of the wall 58, and the angle of the surface region 28, one, two, or three of the surface portions 84, 86, 88 may engage the belt 12, with the sealing assembly 14 in the operative position, to effect sealing. By simultaneously engaging a plurality of the ribs 78, 80, 82, there is redundant sealing and formation of multiple cavities to retain material between adjacent ribs 78, 80, 82.

The wall 58 also has at least one, and in this case three, reliefs 90, 92, 94, extending lengthwise in spaced relationship to respectively produce locally reduced thicknesses 96, 98, 100, thereat defining hinge regions to facilitate bending of the wall 58 as it is set in place for sealing.

As noted above, the connecting assembly 52 is preferably constructed to reconfigure to allow the first and second walls 56, 58 to move relatively freely and universally relative to each other. For example, with the first wall 56 fixed against the containment wall 32, the second wall 58, facially abutted thereto, can be shifted vertically relative thereto in opposite directions, as indicated by the double-headed arrow 102 in FIG. 4, within a range R. The uppermost and lowermost positions for the second wall 58 relative to the first wall 56 are shown respectively at A and B in FIG. 4. This allows the sealing pressure between the second wall 58 and surface region 28 to be selectively set to an optimum amount.

There are many different constructions of the connecting assembly 52 that will permit the desired relative movement between the first and second walls 56, 58. For example, the connecting assembly 52 may be a layer made from woven fibers. The layer may be a fabric material and/or may have a mesh construction.

In a preferred form, the connecting assembly 52 has spaced ends 104, 106 that are respectively embedded in the first and second walls 56, 58. Other connections are contemplated, including one wherein only one, or neither, of the ends 104, 106 is embedded.

This embedding is made possible by making each of the primary and secondary sealing subassemblies 48, 50 from a molded material. While polyurethane is preferred, the material may be any type of resilient material, such as rubber, elastomeric material, etc. The entire sealing assembly 14 can be formed in one molding process. While conceivably the connecting assembly 52 could be molded as one piece with, and from the same materials as, the sealing subassembly 48, 50, preferably the connecting assembly 52 is a separate element with a different composition than the sealing subassemblies 48, 50.

In a preferred form, the connecting assembly 52 has an exposed length L1 between the free ends 108, 110 of the walls 56, 58, respectively, that is at least 0.5 inches. The dimension L1 may be less than 0.5 inches but is preferably greater than 0.5 inches to allow the desired degree of adjustment of the second wall 58 relative to the first wall 56.

The connecting assembly 52 may extend the full lengthwise extent of the first and second walls 56, 58 indicated by the arrow L in FIG. 10. Alternatively, discrete widths of the material making up the connecting assembly 52 may be incorporated at predetermined intervals along the length of the walls 56, 58. As one example, the connecting assembly 52 may consist of a series of components on the order of 3 inches wide at regular intervals.

In an exemplary construction, which is not intended to be limiting, the thickness T for the first wall 56 is on the order of 0.75 inches. The second wall 58 has a thickness T1 from the free end 110 up to the rib 82 on the order of 0.25 inches. The ribs 78, 80, 82 each has a thickness T2 on the order of 0.5 inches. The connecting assembly 52 has a thickness T4 that is substantially less than the thicknesses T, T1. The first wall 56 has a length L3 on the order of 5.00 inches, with the second wall 58 having a length L2 on the order of 6.00 inches. Again, all of these dimensions are but exemplary of one specific form which would be changed depending upon the configuration of the conveying system, the nature of material being conveyed, the desired strength and rigidity, etc.

One specific form of mounting assembly 46 is shown in detail in FIGS. 6-11. The mounting assembly 46 consists of a repositionable holding wall 112. The holding wall 112 is primarily responsible for captively maintaining the region of the second wall 58 at the upper end 76 of the secondary sealing subassembly 50 fixed against the first wall 56, which is in turn captively held against the containment wall 32.

More particularly, the containment wall 32 has an associated base plate 114 that is secured in place against a main containment wall component 116 by a series of regularly spaced fasteners 118. The base plate 114 defines a channel 119 which accepts the heads 120 of threaded bolts 121 which project through the base plate 114 so that threaded shanks 122 thereon are exposed at spaced intervals along the containment wall 32. As an alternative to using the fasteners 118 to secure the base plate 114 to the main containment wall component 116, this connection may be effected by welding as at locations at 124 and/or 126. Both welding and the fasteners 118 may be utilized.

The base plate 114 has a transverse supporting wall 128 that defines an upwardly opening U-shaped channel 130. The channel 130 is designed to cooperate with an inverted, U-shaped channel 132 on the holding wall 112. The channels 130, 132 cooperate to produce a hinge connection which allows the holding wall 112 to be supported in a hanging position from the supporting wall 128 and pivoted between a preassembly position, shown in FIGS. 7 and 8, and a holding position, shown in FIGS. 3, 9 and 10.

In the holding position for the holding wall 112, free edges 134, 136, on a V-shaped fitting 138 at the bottom of the holding wall 1-12, bear against the second surface 62 on the wall 58 to captively maintain the walls 56, 58 between the containment wall 30 and holding wall 112. The V-shaped fitting 138 produces an effective holding width equal to the spacing distance between the edges 134, 136. By reason of providing the edges 134, 136, the fitting 138 digs into the wall surface 62 to positively hold the wall 58 at the desired vertical height.

This holding position of the holding wall 112 is maintained by paired arrangements of cam plates 140 and securing nuts 142, associated with each of the threaded shanks 122. The cam plates 140, as seen most clearly in FIG. 11, each has a generally rectangular shape with an angled cam surface 144 that is inclined with respect to an oppositely facing flat wall 146 that is placed against the holding wall 112. An elongate through slot 148 is formed through each cam plate 140 to receive a threaded shank 122. The threaded shanks 122 have a length sufficient to pass fully through the slot 148 to be exposed to accept a securing nut 142. The securing nuts 142 can be initially snugged against the cam plate surfaces 144 at a "low" side 150 thereon. By then forcibly advancing the cam plates 140 in the direction of the arrow 152, the securing nuts 142 slide against the surface 144 towards a "high" side 154. This produces a camming action that progressively wedges the holding wall 112 in a direction toward the containment wall 30. This biasably loads the fitting 138 against the wall 58 to positively maintain the sealing assembly 114 in the operative position. Additional details of the mounting assembly 46 are seen in U.S. Pat. No. 6,647,062, which is incorporated herein by reference.

Figure 7:
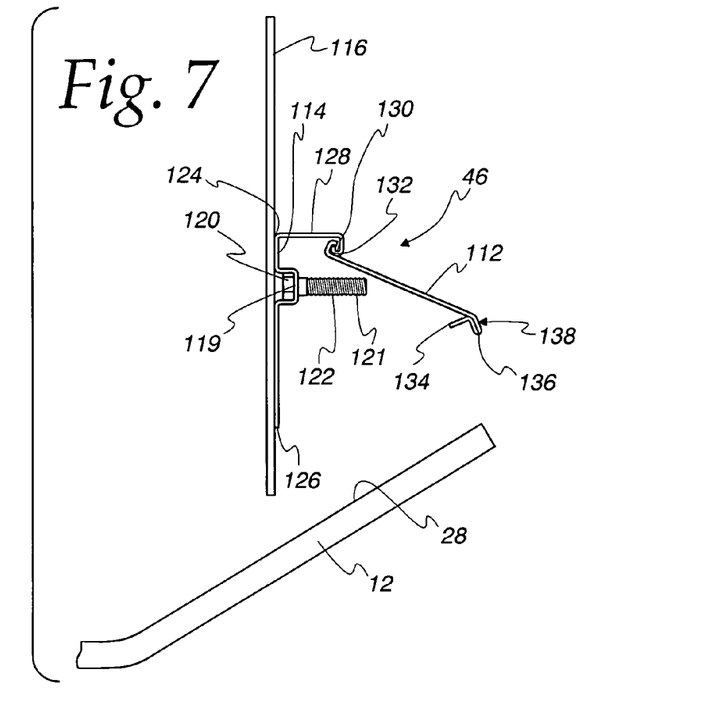
FIG. 7 is a view as in FIG. 6 with the holding wall in a preassembly position.
Figure 8:
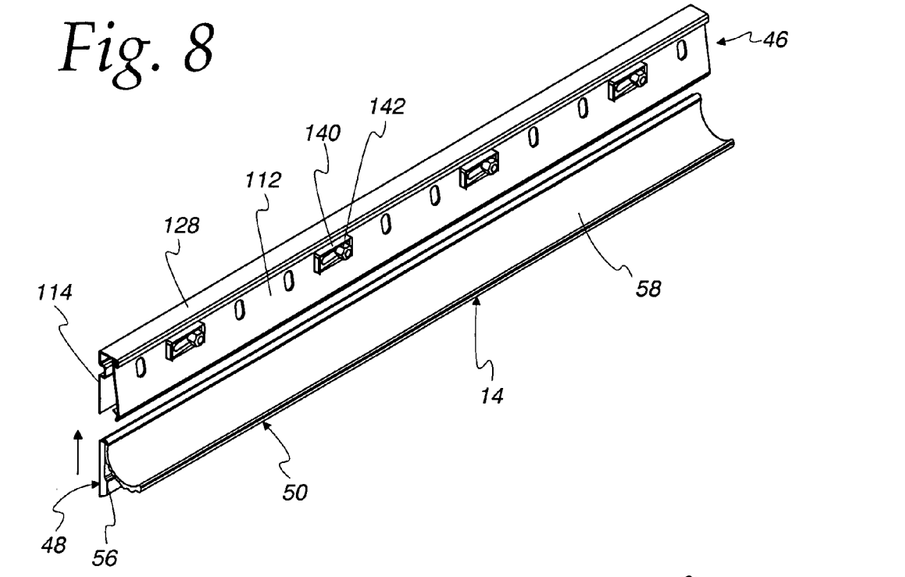
FIG. 8 is a perspective view of the mounting assembly as in FIG. 7, with the sealing assembly being directed upwardly towards an operative position.
Figure 9:
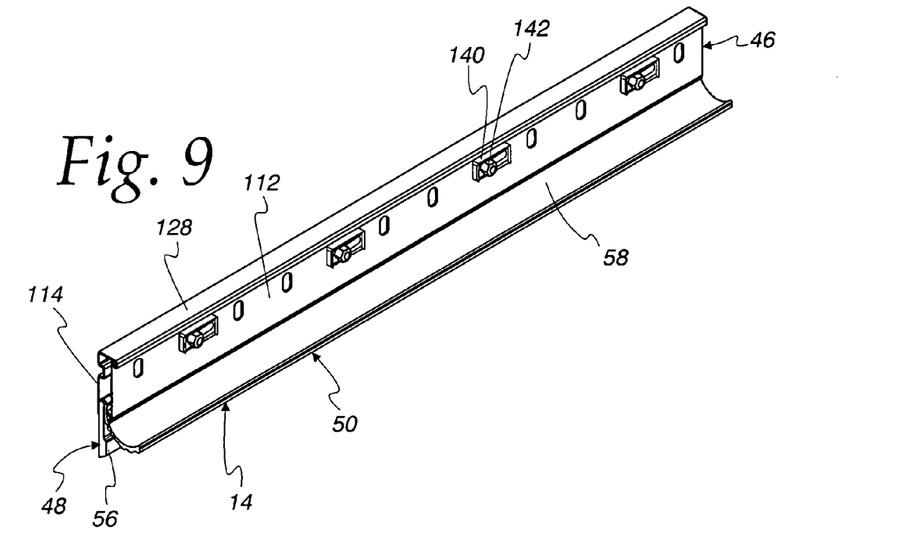
FIG. 9 is a view corresponding to that in FIG. 8 wherein the sealing assembly is in the operative position and the holding wall is moved into a holding position.

To install the sealing assembly 14, the mounting assembly 46 is pre-installed and the holding wall 112 pivoted to the preassembly position shown in FIG. 7. The first wall 56, making up the primary sealing subassembly 48, is placed against the containment wall 30 and shifted downwardly so that the bottom edge 72 facially engages the angled surface region 28. The second wall 58, making up the secondary sealing subassembly 50, is then pulled away from the first wall 56 and configured in the curved shape to bear sealingly against the angled surface region 28. The desired number of ribs 78, 80, 82 is brought into contact with the surface region 28. Once the desired positions of the first and second walls 56, 58 is established, the holding wall 112 can be pivoted to the holding position. The cam plates 140 are then installed using the securing nuts 142 and shifted, as by the application of a blow from a hammer, or other heavy instrument, to produce the desired holding force.

The foregoing disclosure of specific embodiments is intended to be illustrative of the broad concepts comprehended by the invention.

The invention claimed is:

1. A sealing assembly for a conveying system between a conveying belt and a containment wall situated laterally relative to a conveying portion of the conveying belt, the sealing assembly comprising:
   a primary sealing subassembly;
   a secondary sealing subassembly; and
   a connecting assembly that joins and maintains the primary sealing subassembly and secondary sealing subassembly together,
   the connecting assembly defining a locally flexible region whereat the sealing assembly can be reconfigured to allow selective movement of the primary and secondary sealing subassemblies each relative to the other,
   the sealing assembly configured so that with the sealing assembly in an operative position on a conveying system: a) a primary sealing subassembly is situated to block passage of material from a conveying portion of a conveying belt laterally beyond a containment wall; and b) the secondary sealing subassembly is situated to laterally confine material that has moved laterally beyond a containment wall from a conveying portion of a conveying belt, along a length of the conveying system.

2. The sealing assembly according to claim 1 wherein the connecting assembly is constructed to allow the primary and secondary sealing subassemblies to be placed and maintained in a plurality of different relative positions without the application of any external forces upon the sealing assembly.

3. The sealing assembly according to claim 2 wherein the connecting assembly comprises a fabric material.

4. The sealing assembly according to claim 2 wherein the connecting assembly comprises a layer made from woven fibers.

5. The sealing assembly according to claim 2 wherein the connecting assembly comprises a layer with a mesh construction.

6. The sealing assembly according to claim 2 wherein the connecting assembly comprises a flexible layer that is embedded in at least one of the primary and secondary sealing subassemblies.

7. The sealing assembly according to claim 2 wherein the connecting assembly comprises a flexible layer that is embedded in each of the primary and secondary sealing subassemblies.

8. The sealing assembly according to claim 2 wherein the primary and secondary sealing sub assemblies and connecting assembly each has a thickness, the connecting assembly is joined to the primary sealing subassembly at an end of the primary sealing subassembly and to the secondary sealing subassembly at an end of the secondary sealing assembly, and the thickness of the connecting assembly is substantially less than the thickness of at least one of the ends of the primary and secondary sealing subassemblies.

9. The sealing assembly according to claim 8 wherein the thickness of the connecting assembly is substantially less than the thickness of each of the ends of the primary and secondary sealing subassemblies.

10. The sealing assembly according to claim 1 in combination with a conveying system on which the sealing assembly is placed in the operative position, the conveying system comprising, a conveying belt with an upwardly facing surface having a conveying portion and a containment wall situated laterally relative to the conveying portion of the conveying belt so that a gap is defined between a bottom edge of the containment wall and the upwardly facing conveying belt surface, the combination further including a mounting assembly through which the sealing assembly is maintained in the operative position.

11. The combination according to claim 10 wherein the primary sealing subassembly comprises a first wall that is attached to the containment wall and at least partially blocks the gap between the bottom edge of the containment wall and the upwardly facing conveying belt surface to thereby block passage of material through the gap to laterally outside of the containment wall.

12. The combination according to claim 11 wherein the upwardly facing conveying belt surface comprises a generally horizontal oriented surface region defining at least part of the conveying portion and an angled surface region that projects upwardly laterally away from the horizontally oriented surface region, and the secondary sealing subassembly comprises a second wall that bears against the angled surface region to confine material that has passed through the gap to laterally outside of the containment wall.

13. The combination according to claim 12 wherein the mounting assembly comprises a repositionable holding wall and the first and second walls are maintained against each other and captively between the holding wall and the containment wall.

14. The combination according to claim 13 wherein the first wall comprises first and second oppositely facing generally flat surfaces, the second wall comprises third and fourth oppositely facing generally flat surfaces and with the sealing assembly in the operative position, a portion of the fourth wall facially abuts to the containment wall and portions of the first and third walls are facially engaged, each with the other.

15. The combination according to claim 12 wherein the sealing assembly has a length and the second wall has at least a first rib extending lengthwise of the sealing assembly and having a rounded surface portion that engages the angled surface region along a length of the sealing assembly.

16. The combination according to claim 15 wherein the second wall has a locally reduced thickness defining a hinge region extending along the length of the sealing assembly.

17. The combination according to claim 15 wherein the second wall has a second rib extending generally parallel to the first rib with a rounded surface portion that engages the angled surface region along the length of the sealing assembly.

18. The combination according to claim 2 wherein the connecting assembly has a different composition than a composition of each of the primary and secondary sealing subassemblies.

19. The combination according to claim 6 wherein the flexible layer has a length between the primary and secondary sealing subassemblies of at least 0.5 inches.

20. The combination according to claim 18 wherein the primary and secondary sealing subassemblies each comprises a molded polyurethane material.

* * * * *